INVENTOR
RENÉ MILLET

BY Emmett F. Salter
ATTORNEY

April 26, 1966  R. MILLET  3,248,192
METHOD AND APPARATUS FOR THE MANUFACTURE OF FIBERS FROM GLASS
OR OTHER THERMOPLASTIC MATERIALS
Filed Aug. 15, 1962  3 Sheets-Sheet 2
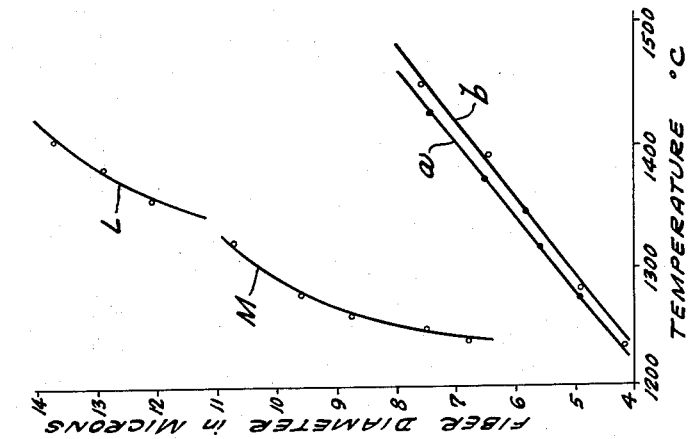
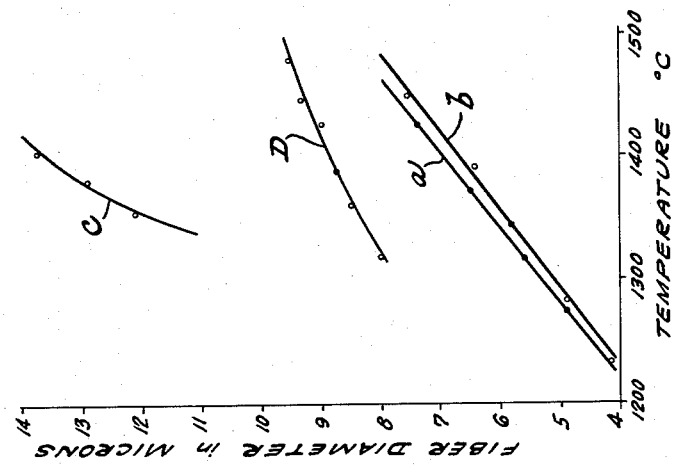
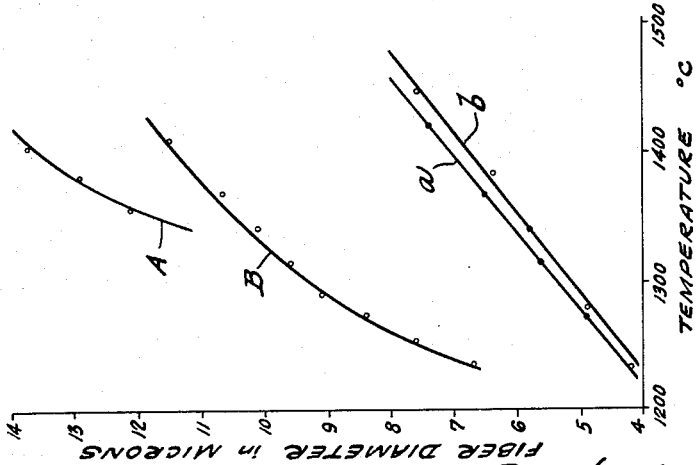
INVENTOR
RENÉ MILLET
BY Emmett F. Sulter
ATTORNEY

INVENTOR
RENÉ MILLET

United States Patent Office 3,248,192
Patented Apr. 26, 1966

3,248,192
METHOD AND APPARATUS FOR THE MANUFACTURE OF FIBERS FROM GLASS OR OTHER THERMOPLASTIC MATERIALS
René Millet, Neuilly, France, assignor to Compagnie de Saint-Gobain, Neuilly-sur-Seine, France, a corporation of France
Filed Aug. 15, 1962, Ser. No. 217,091
Claims priority, application France, May 29, 1959, 795,989; Mar. 19, 1962, 891,478
10 Claims. (Cl. 65—5)

This is a continuation-in-part of my application Serial No. 31,387, filed May 24, 1960, now abandoned.

This invention relates to improvements in the manufactor of glass fibers or other mineral thermoplastic materials, and more particularly to arrangements in which the material in a molten state is located in a crucible or bushing and flows in the form of filaments through nipples provided in the bottom of said crucible or bushing, after which said filaments are drawn into fibers.

In these arrangements, the supply of molten material contained in the crucible or bushing being maintained at a relatively high temperature, it is necessary, in order to eliminate the danger of devitrification of the glass, to pass quickly from this high temperature to the drawing temperature, and consequently to exert a cooling action on the filament-generating cones to bring these filaments, in the zone where they are drawn, to a temperature suitable for drawing. As is known in the art, this temperature must be controlled very accurately, according to the nature of the glass and the diameter of the fibers to be obtained. The diameter of the fibers obtained is, as a matter of fact, all the more uniform when the temperature of the glass filaments flowing through each nipple is kept more constant, and when the temperature differences between the different filaments passing through the nipples of the crucible or bushing are smaller.

It is likewise known in the art to provide cooling devices located parallel to the row or rows of bushing orifices, such devices acting by radiation, and in particular being cooled by circulation of a gaseous or liquid fluid inside said devices. It is also known in the art to place in the immediate vicinity of the nipples, cold elements acting as shields, and which besides cooling the glass coming out of said orifices more swiftly, counteract the air whirls around the nipples and around the filament-generating cones.

However, such known devices do not permit the cooling of the nipples and the filament-generating cones in a quite regular manner and on all sides simultaneously.

It is an object of the present invention to cause the nipples and the filament-generating cones to be surrounded with a gaseous fluid of constant or controlled composition and of such temperature as to impart to the filaments the temperature most suitable for their drawing into fibers. Preferably the temperature of the gaseous fluid is adjusted so as to permit a variation of the cooling action exerted on the glass filaments.

Steam, especially at temperatures comprised between 150° C. and 200° C., may be advantageously used as a gaseous fluid, as well as gases in the pure state.

Among many important advantages offered by the arrangements according to the invention, the following may be cited:

First, it permits the obtention of a homogeneous and easily controlled temperature of all the filaments during their formation. The result is that the manufacture of fibers may be made continuous and that the fibers obtained have a uniform diameter and a high quality.

Furthermore, the efficiency of the cooling and its uniform action enable the use of thicker-walled nipples which are easier to be machined.

Besides, the surface tension and composition of the material to be drawn into fibers may be modified by adequately choosing the fluid and its temperature. A control on the output of the nipples is thus made possible.

In particular, the invention permits varying, within relatively substantial limits, the diameter of the fibers which are produced, without having to modify or change the drawing plates and by maintaining the temperature of the glass constant at the outlet nipples of the drawing plates. Changing the temperature at the interior of the spinner is thus avoided, such a temperature change presenting the disadvantage of modifying the convection currents in the spinner, and giving rise to lack of uniformity or homogeneity, which disturbs its operation. In addition, the invention permits the obtention of fibers of predetermined diameter and operating at lower fiberizing temperatures, which has the effect of reducing substantially the wear of the spinning orifices, and reducing the losses of the metal of which they are formed, for example, a platinum alloy.

The applicant has found, and this constitutes one of the characteristics of the present invention, that for a given temperature of glass in the zone around the nipple outlets of the spinners, and for a given drawing-out velocity of the filaments, the diameter of the fibers produced may be varied by controlling the following factors: (a) the direction of the gaseous current in the hood with respect to the fibers; (b) the velocity of gaseous current; and (c) the temperature of the gaseous current.

Experience has shown, for instance, that when steam at a temperature comprised between 150° C. and 200° C. is used with a given glass, fibers of the same diameter may be obtained by either reducing the temperature of the nipples about 10% or increasing the drawing speed about 20%.

With another glass treated in the same conditions with steam at a temperature of about 300° C., fibers of 5.8 microns have been obtained (instead of 7.5 microns without steam), without changing either the temperature of the nipples or the drawing speed. Besides, the glass of the new fibers proved more resistant to dampness, which indicates a change in composition or surface tension. It has also been observed that, with the present invention, a greater number of full bobbins may be produced without interruption due to breakage of fibers.

The present invention also permits the obtaining of fibers from certain glass compositions which, up to now, have been difficult or impossible to convert into fibers, as it was not possible to obtain for such glasses the condition of viscosity required for such a conversion. The application of the gaseous fluid at an adequate temperature around the nipples and the filament-generating cones according to the invention permits such a formation of fibers from these glasses through a regulation of the temperature of the medium surrounding the formation zone. Such a regulation permits a rapid lowering of the viscosity of the very fluid glass coming out of the nipples so as to bring it within the viscosity range in which fibers may be formed.

The accompanying drawings show, merely by way of example, different arrangements according to the present invention, and portray the varying results attainable thereby.

In the drawings,

FIGS. 3 to 7 are charts plotted from data illustrating the variations in the diameters of the filaments at different temperatures resulting from different conditions imposed upon the filaments being drawn.

Figure 1:
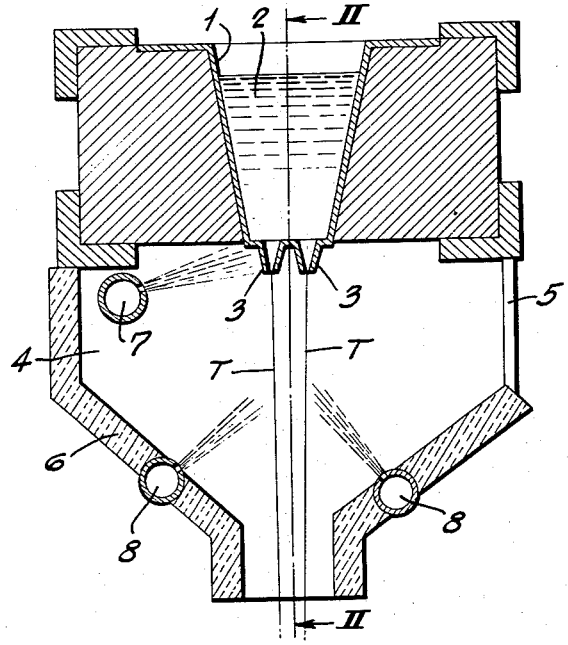
FIG. 1 is a vertical sectional view of the apparatus in accordance with the invention.

In the embodiment illustrated in FIGS. 1 and 2, the apparatus for the production of the glass filaments to be subsequently drawn comprises a bushing 1, containing molten glass 2 heated, for instance, by an electric current. This bushing is provided, at its bottom part with several rows of nipples 3 from which flow out a plurality of glass filaments T to be transformed into fibers. The hood 4, which surrounds the glass filaments and protects them against the influence of the outside atmosphere, matches exactly with bushing 1. This hood comprises a tight-closing door 5 through whose opening the nipples may be observed and the building-up of the cones checked. Hood 4 may be heat-insulated by means of an insulating material 6. Below the bottom of container 1 are located blowers 7 through which a gaseous fluid at an adequate temperature, for instance, steam at a temperature between 150° C. and 200° C., is introduced into the hood. The direction of steam jets may be varied. More particularly the jets may be directed towards nipples 3 to cause the fluid to surround the nipples on all sides and to obtain a controlled circulation of fluid securing an identical cooling for all the nipples and cones.

Two other blowers 8 may be located at the bottom part of the hood. The gaseous fluid escaping from the blowers fills the hood completely and surrounds the glass filaments in the course of their attenuation into fibers.

Figure 1A:
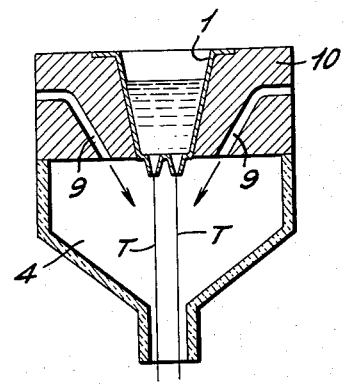
FIGS. 1a and 1b are vertical sectional views of two different embodiments of the apparatus illustrating two alternative variants thereof, in respect to the blowing organs acting on the filaments being drawn.
Figure 2:
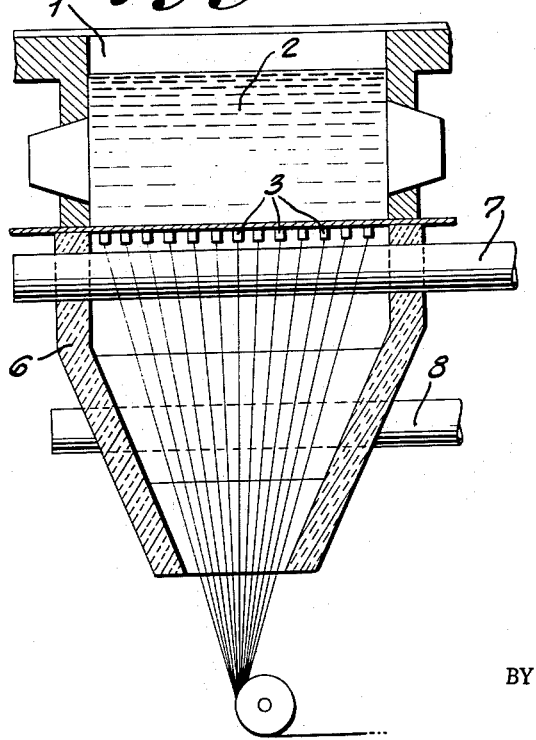
FIG. 2 is a longitudinal sectional view along line II—II of FIG. 1.
Figure 1B:
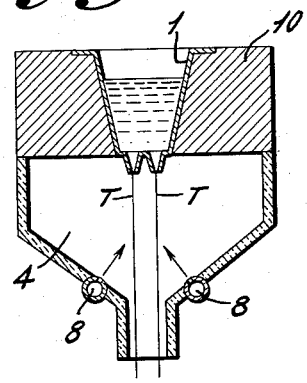

FIGS. 1a and 1b show devices similar to those shown in FIGS. 1 and 2, with means for controlling accurately the direction of the gaseous currents acting on the fibers. In FIG. 1a, symmetrically disposed passages 9 are formed in the body 10 which supports the bushing or drawing plate 1. The gaseous currents are directed through these passages 9 into hood 4 symmetrically with respect to the rows of fibers issuing from the outlet nipples 3, and with a component parallel to the direction of movement of the fibers and in the same direction of travel as the latter. On the other hand, in FIG. 1b, the gaseous currents issuing from the blower tubes 8 at the bottom of the hood are directed upwardly, as shown in FIG. 1, with a component parallel to the fibers but in a direction opposite to the travel of the latter.

It has been determined that diameters of the fibers may be controlled finely by varying the factors mentioned above.

Thus, if a component parallel to the direction of movement of the fibers is given to the travel of the gaseous current, and in the same direction as the fibers, it has been determined that, all other things being equal, fibers were obtained having a larger diameter than if the gas current presents a component of motion directed in an opposite sense to that of the fibers.

In the attached drawing, curves A and B of FIG. 3 show the diameters of fibers as a function of temperature of the glass at the spinner nipples, obtained by directing a current of nitrogen gas in the same direction as the fibers and in inverse direction, respectively. These curves A and B were obtained by using the arrangements shown in FIGS. 1a and 1b, respectively. These curves, as well as those of the other figures, were obtained with glass of the following approximate composition:

| | Percent |
|---|---|
| $SiO_2$ | 52.31 |
| $Al_2O_3$ | 16.57 |
| $Fe_2O_3$ | 0.42 |
| CaO | 17.60 |
| MgO | 5.05 |
| $Na_2O$ | 0.33 |
| $K_2O$ | 0.11 |
| $B_2O_3$ | 7.70 |
| F | traces |

Curves A and B were both obtained while using dry nitrogen at about 140° C., for a drawing-out velocity of the fibers of approximately 40 meters per second, and with an inflow of 860 liters of nitrogen per hour, at a temperature of approximately 19° C.

It is found that in the case of curve A, fibers of substantially larger diameters were obtained than in the case of curve B, for the same fiberizing temperatures, that is, for the same temperatures of glass at the spinner nipples. It is found that a very simple mode of control is thus available, which does not require any change in the spinning orifices to obtain fibers of the desired diameter.

The variation in diameter of the fibers may also be obtained, as indicated above, by controlling the flow of gaseous fluid introduced into the hood or hopper.

Curves C and D of FIG. 4 of the attached drawings portray the diameter of fibers obtained by directing, from above, (FIG. 1a), a current of nitrogen in the same direction as the fibers as a function of the temperature of the glass at the spinner nipples. Curve C corresponds to a delivery of nitrogen, amounting to 860 liters per hour, and curve D to a delivery of 130 liters of nitrogen per hour. These curves were obtained with dry nitrogen at about 130° C. with a mechanical drawing-out velocity of the fibers of 40 meters per second.

It is seen that by increasing the inflow of gas into the hood, the diameter of the fibers, for a given temperature at the spinner nipples and a given drawing-out velocity, is increased.

Figure 5:
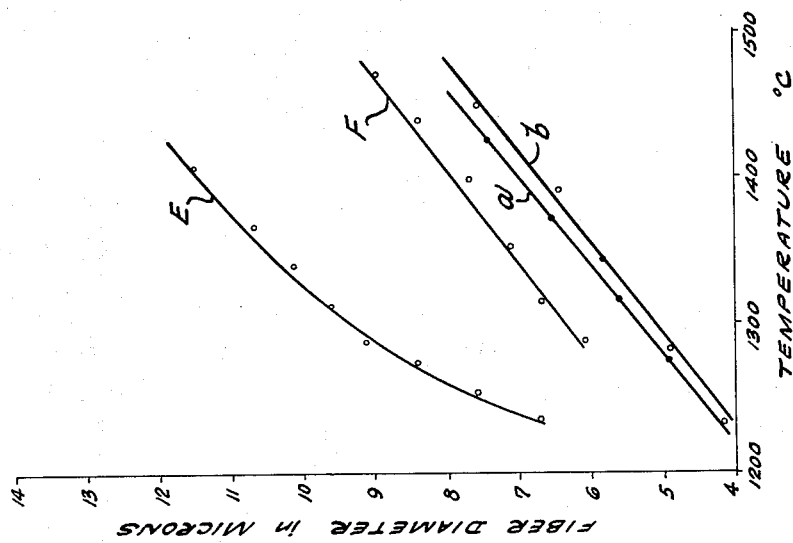

Curves E and F of FIG. 5 were made following tests performed under the same conditions as those relating to curves C and D of FIG. 4, but with a gaseous current issuing from below (FIG. 1b), whose component of motion is in a direction opposite to the movement of the fibers (lower inlet). It is also seen that in the two cases (curves C, D, E and F), the increase of the flow of gas into the hood is reflected in an increase of fiber diameter, curves E and F corresponding to nitrogen flow of 860 liters per hour and 130 liters per hour, respectively.

Figure 6:
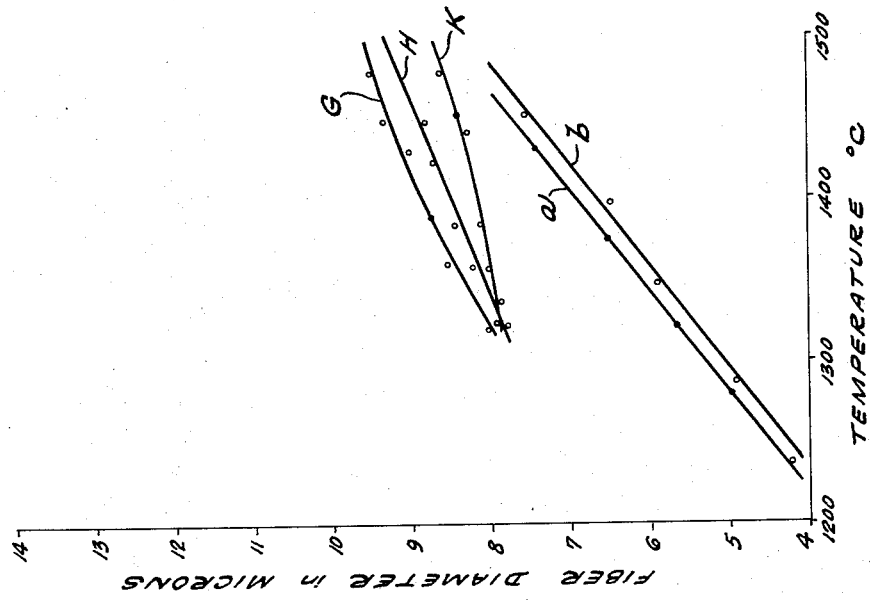

Curves G, H and K of FIG. 6 show the effect of the temperature of the gaseous current on the diameter of the fibers obtained. These curves were drawn following tests made with dry nitrogen, at a flow of 130 liters per hour ($t=19°$ C.) introduced into the hood so that one component of its motion is in the direction of movement of the fibers, using the arrangement shown in FIG. 1a.

Curves G, H, and K refer, respectively, to nitrogen temperatures of 128° C., 178° C., and 215° C. It is seen that, by increasing the temperature of the gaseous current, there is a tendency to decrease the diameter of the fibers for a constant temperature of the glass at the spinner nipples.

It is interesting to observe also that when the temperature of the gas is raised sufficiently (see especially curve K), the diameter of the fibers becomes practically independent of the fiberizing temperatures. Under these conditions, substantial variations of the temperature of the glass at the spinner nipples have little effect on the diameter of the fibers.

Curves L and M of FIG. 7 show that the nature of the gases introduced into the basket has an effect on the results. These two curves were made after tests performed under the same conditions of inflow of the gas current from above, at a mechanical drawing-out velocity of the fibers of 40 meters per second, and a gas flow supply of 860 liters per hour. Curve L refers to a dry nitrogen stream at 137° C. and curve M of water vapor at 128° C. It will be noted that the utilization of a stream of water vapor allows large variations in diameter of fibers which may be obtained, between around 6 and 11 microns, for fiberizing temperatures varying between about 1220° C. and 1340° C.

On all the figures there are shown, by way of reference, curves showing variations of diameter of the fibers as functions of the temperature of the glass at the spinner nipples, curves "a" and "b" portraying the diameters obtainable without a hood and with a hood, respectively, in the absence of all circulation of fluid in the hood. These reference curves show, in a general way, the improvement which results from the utilization of a hood with a controlled circulation of fluid therein.

It must be understood that the present invention is not limited to the described and illustrated embodiments but that it allows of many variations, its scope being defined in the appended claims.

I claim:

1. The method of manufacture of glass fibers of a finely controlled diameter, which comprises spinning by gravity a plurality of thin fiber streams in filamentary form from a mass of molten glass at a predetermined temperature into an enclosing hood wherefrom the fibers are drawn, blowing a gaseous fluid into said hood for interaction with said fiber streams, and varying the characteristics of said gaseous fluid to control the diameters of the glass fibers issuing from said hood.

2. The method of manufacture of glass fibers of a finely controlled diameter, which comprises spinning by gravity a plurality of thin fiber streams in filamentary form from a mass of molten glass at a predetermined temperature into an enclosing hood wherefrom the fibers are drawn, blowing a gaseous fluid into said hood for interaction with said fiber streams in a direction having a component parallel to the row of said fiber streams, and directing said gaseous fluid into said hood so that said component is in the same or opposite direction as the travel of the fiber streams to control the diameters of the glass fibers issuing from said hood.

3. The method of manufacture of glass fibers of a finely controlled diameter, which comprises spinning by gravity a plurality of thin fiber streams in filamentary form from a mass of molten glass at a predetermined temperature into an enclosing hood wherefrom the fibers are drawn, blowing a gaseous fluid into said hood for interaction with said fiber streams, and varying the flow of said gaseous fluid to control the diameters of the glass fibers issuing from said hood.

4. The method of manufacture of glass fibers of a finely controlled diameter, which comprises spinning by gravity a plurality of thin fiber streams in filamentary form from a mass of molten glass at a predetermined temperature into an enclosing hood wherefrom the fibers are drawn, blowing a gaseous fluid into said hood for interaction with said fiber streams, and varying the composition of said gaseous fluid to control the diameters of the glass fibers issuing from said hood.

5. The method of manufacture of glass fibers of a finely controlled diameter, which comprises spinning by gravity a plurality of thin fiber streams in filamentary form from a mass of molten glass at a predetermined temperature into an enclosing hood wherefrom the fibers are drawn, blowing a gaseous fluid into said hood for interaction with said fiber streams, and varying the temperature of said gaseous fluid to control the diameters of the glass fibers issuing from said hood.

6. In an apparatus for the manufacture of mineral thermoplastic material, in particular glass fibers, the combination of a bushing having in its lower part a plurality of nipples through which the molten glass issues in cones, means for drawing the fibers as formed, a hood disposed under said bushing for insulating the nipples from ambient air and surrounding the fibers in the course of their formation, said hood having in its lower part an orifice for the passage of the fibers, blowers disposed inside said hood in the vicinity of the nipples and cones so as to create a controlled circulation of fluid for securing an identical cooling for all the nipples and cones, and means for controlling the fluid in respect to composition, temperature and/or quantity, to vary the diameter of the fibers issuing from the orifice in said hood.

7. In an apparatus for the manufacture of mineral thermoplastic material, in particular glass fibers, the combination of a bushing having in its lower part a plurality of spinner nipples through which the molten glass issues in cones, means for drawing the fibers as formed, a hood disposed under said bushing for insulating the nipples from ambient air and surrounding the fibers in the course of their formation and having in its lower part an orifice for the passage of the fibers, means for feeding a gaseous fluid into said hood, and means for controlling the fluid in respect to the direction of flow thereof relative to the direction of travel of the fibers, its composition, temperature and/or quantity to vary the diameter of the fibers issuing from the orifice in said hood.

8. An apparatus as set forth in claim 7 wherein said feeding means comprises conduits having outlets opening into said hood for bathing the nipples and the fibers issuing therefrom with said gaseous fluid.

9. An apparatus as set forth in claim 8 wherein said outlet openings are so directed that the gaseous fluid flowing therefrom has a downward vertical component.

10. An apparatus as set forth in claim 8 wherein said outlet openings are so directed that the gaseous fluid flowing therefrom has an upward vertical component.

References Cited by the Examiner
UNITED STATES PATENTS

| | | | |
|---|---|---|---|
| 2,175,224 | 10/1939 | Slayter | 65—12 |
| 2,225,667 | 12/1940 | Staelin | 65—12 |
| 2,291,289 | 7/1942 | Slayter et al. | 65—12 |
| 2,635,389 | 4/1953 | Toulmin | 65—12 |
| 2,699,415 | 1/1955 | Nachtman | 65—3 |

DONALL H. SYLVESTER, *Primary Examiner.*